United States Patent [19]

Dacus et al.

[11] 4,333,355
[45] Jun. 8, 1982

[54] PRESSURE BALANCED DRAG TURBINE MASS FLOW METER

[75] Inventors: Michael W. Dacus, Gilbert; Jack H. Cole, Fayetteville, both of Ark.

[73] Assignee: The United States of America as represented by the United States Department of Energy, Washington, D.C.

[21] Appl. No.: 143,058

[22] Filed: Apr. 23, 1980

[51] Int. Cl.³ .............................................. G01F 1/10
[52] U.S. Cl. ................................ 73/861.91; 73/32 R; 73/861.02
[58] Field of Search .......... 73/861.91, 861.83, 861.01, 73/861.02, 861.03, 32 R

[56] References Cited

U.S. PATENT DOCUMENTS

| | | | |
|---|---|---|---|
| 3,176,222 | 3/1965 | Atkisson | 324/61 |
| 3,298,221 | 1/1967 | Miller et al. | 73/32 R |
| 3,783,688 | 1/1974 | Knauth | 73/194 R |
| 3,958,447 | 5/1976 | Baker et al. | 73/32 R |
| 4,111,046 | 9/1978 | Amemori et al. | 73/861.91 |
| 4,196,613 | 4/1980 | Cole | 73/32 R |

FOREIGN PATENT DOCUMENTS

| | | | |
|---|---|---|---|
| 874464 | 8/1961 | United Kingdom | 73/861.83 |
| 1186979 | 4/1970 | United Kingdom | 73/861.83 |

*Primary Examiner*—Donald O. Woodiel
*Attorney, Agent, or Firm*—Hugh W. Glenn; Paul A. Gottlieb; Richard G. Besha

[57] ABSTRACT

The density of the fluid flowing through a tubular member may be measured by a device comprising a rotor assembly suspended within the tubular member, a fluid bearing medium for the rotor assembly shaft, independent fluid flow lines to each bearing chamber, and a scheme for detection of any difference between the upstream and downstream bearing fluid pressures. The rotor assembly reacts to fluid flow both by rotation and axial displacement; therefore concurrent measurements may be made of the velocity of blade rotation and also bearing pressure changes, where the pressure changes may be equated to the fluid momentum flux imparted to the rotor blades. From these parameters the flow velocity and density of the fluid may be deduced.

6 Claims, 4 Drawing Figures

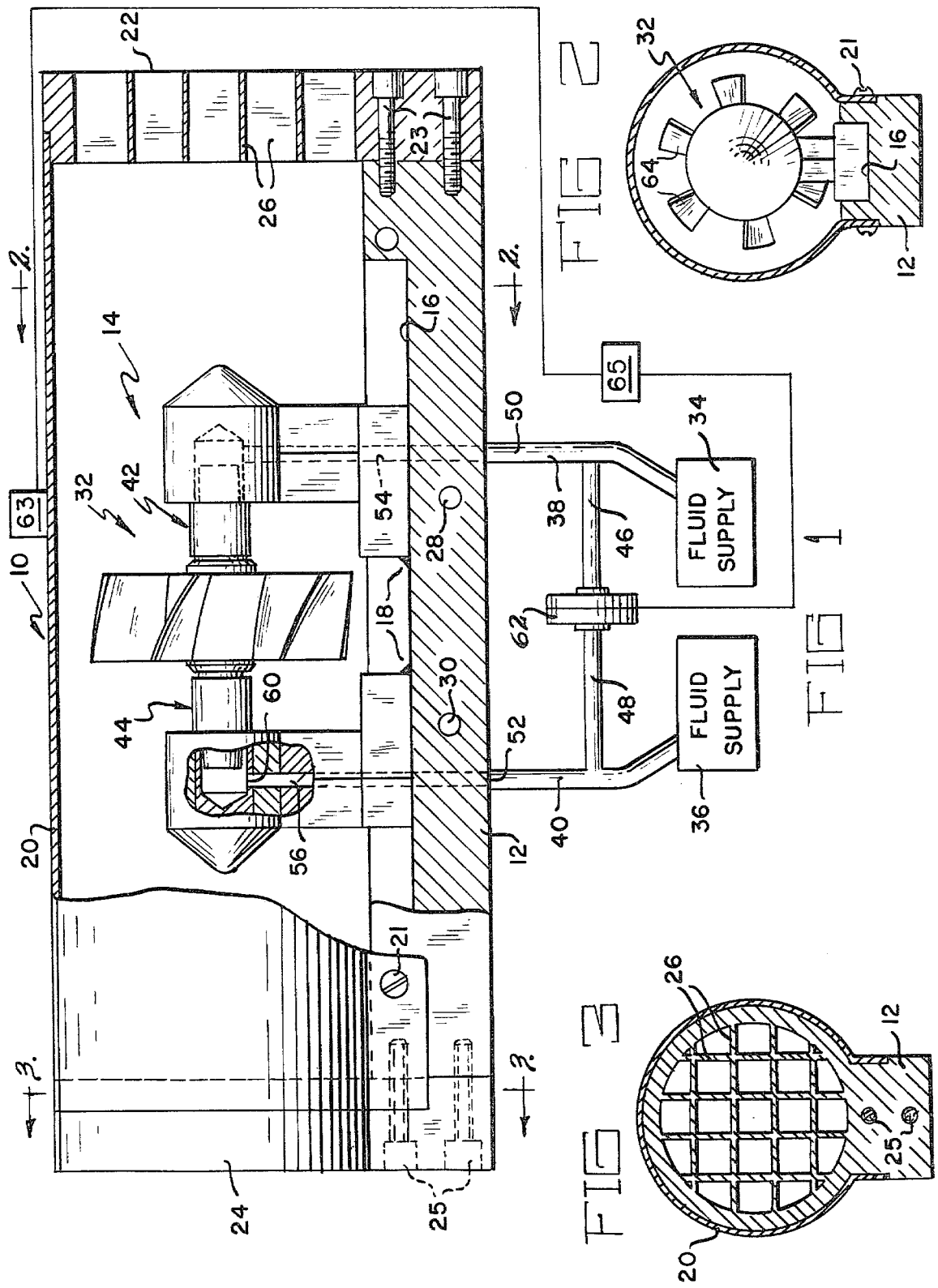

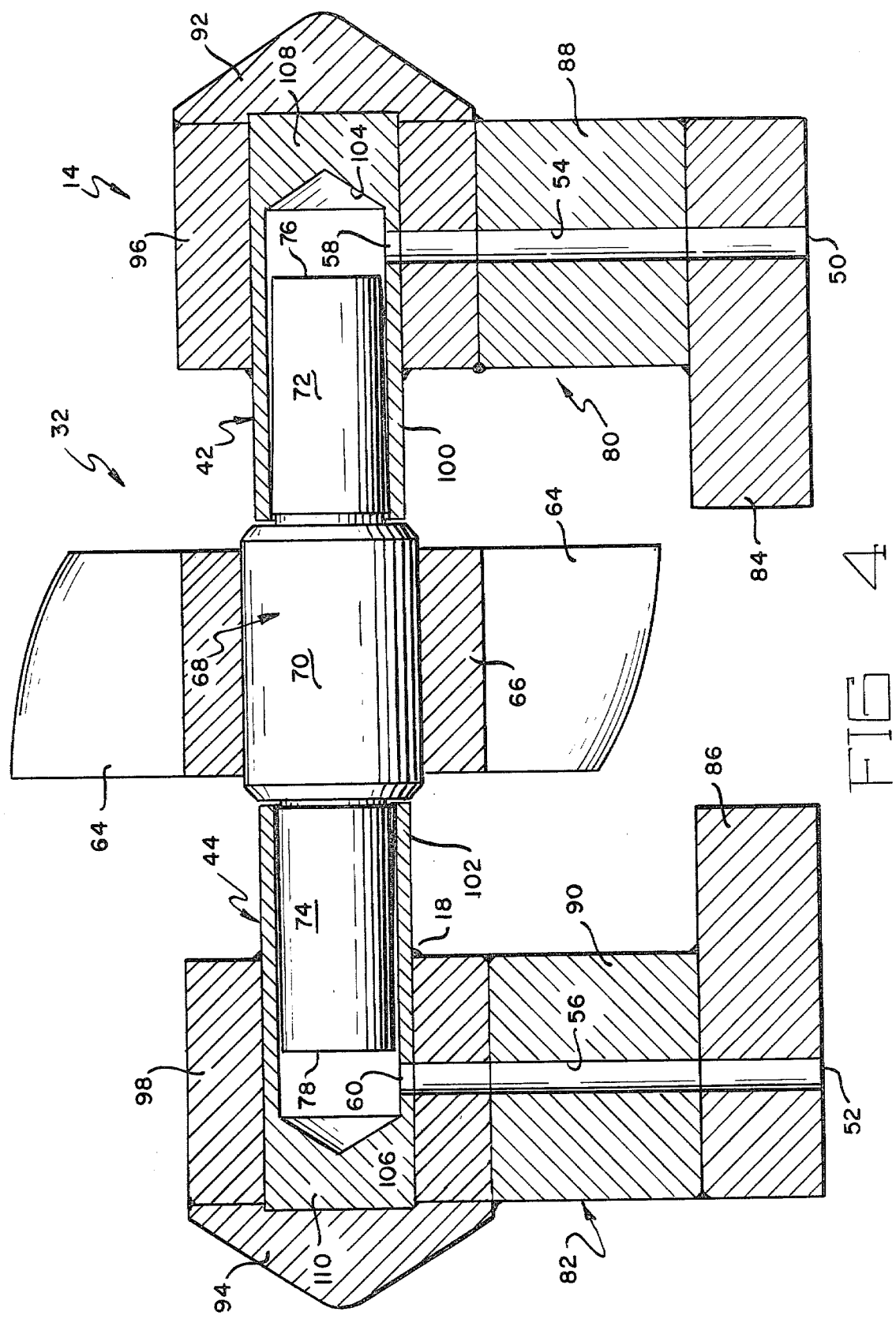

PRESSURE BALANCED DRAG TURBINE MASS FLOW METER

CONTRACTUAL ORIGIN OF THE INVENTION

The invention described herein was made in the course of, or under, a contract with U.S. DEPARTMENT OF ENERGY.

BACKGROUND OF THE INVENTION

This invention represents an improved device for simultaneous measurement of the flow velocity and density of a fluid flowing in a tubular member. In particular this invention has been developed to meter nonhomogeneous mixtures of water and steam in high-pressure water lines of a nuclear reactor. Until recently the measurement of fluid velocity and density had been accomplished by a device containing a turbine for velocity determination and a separate drag disc for measurement of momentum flux (density may be determined from the velocity and the momentum flux). The use of separate units to measure velocity and momentum flux may, however, result in anomalous data collection due to the shadowing effect one measuring unit has on the other. Further, each unit necessarily measures a different volume element of the flowing fluid, which can be quite inhomogeneous for two phase mixtures such as water-steam.

The limitations imposed by separate measuring units have been overcome in another invention by the applicant J. H. Cole, "Device for Measuring the Fluid Density of a Two Phase Mixture", Ser. No. 957,618, filed Oct. 30, 1978, now U.S. Pat. No. 4,196,613. The novel achievement was the use of a single rotor blade assembly to determine both the fluid velocity and drag force simultaneously for the identical sample of fluid. This unit functions as intended unless the fluid contains a dispersion of small particulate matter, which can be a contaminant or corrosion product in high-pressure water lines. Accumulation of such particulate on the bearing surfaces eventually leads to bearing seizure and failure of the fluid metering device.

It is therefore an object of the present invention to provide a device capable of measuring the density and velocity of a fluid flowing through a tubular member.

It is also an object of the this invention to provide a device which can measure concurrently the velocity and density of the identical fluid sample flowing through a tubular member.

It is a further object of the present invention to provide a device which can measure the density and velocity of flowing fluid containing a dispersion of small particulate matter without such matter causing bearing failure.

SUMMARY OF THE INVENTION

The present invention includes a rotor assembly supported by a fluid bearing means such that both rotation and displacement of the assembly may occur. Each bearing has an independent fluid supply of constant flow, and attached to the supply lines are independent pressure monitor lines which terminate at a common pressure transducer.

BRIEF DESCRIPTION OF THE DRAWINGS

Other objects, features, and advantages of the present invention will become more apparent from the following detailed description of the preferred embodiment, the appended claims, and the accompanying drawings:

FIG. 1 illustrates the fluid metering system as a whole.

FIG. 2 is a vertical sectional view of the mounting assembly utilized as the container for the invention.

FIG. 3 is a vertical sectional view of the end cover of the mounting assembly.

FIG. 4 is a longitudinal sectional view of the fluid metering device.

DETAILED DESCRIPTION OF THE PREFERRED EMBODIMENT

The preferred embodiment of the invention is shown in FIGS. 1–4. This embodiment is designed to measure fluid flow in either direction in a tubular member. For ease of installation in the tubular member, the invention is contained within assembly mount 10 shown in FIG. 1. Assembly mount base 12 accommodates the fluid meter assembly 14 shown in detailed cross section in FIG. 4. Fluid meter assembly 14 is positioned in channel 16 of mount 10 and held in place by welds 18. Assembly 14 is enclosed within assembly mount 10 by shroud 20 shown in FIGS. 1 and 2 and end covers 22 and 24 as shown in FIGS. 1 and 3. Shroud 20 is attached to base 12 by bolts 21, and end covers 22 and 24 are joined to base 12 by bolts 23 and 25, respectively. End covers 22 and 24 include a cross-hatched, square network of flow straightener vanes 26 shown in cross section in FIG. 3. The entire assembly mount 10 is bolted to the inside of the tubular member by engaging base 12 to a suitable mounting bracket interior to the tubular member through bolt holes 28 and 30.

The utilization of fluid bearings in fluid meter assembly 14 permits concurrent rotation and translation of rotor assembly 32 with minimization of frictional forces. Further, this bearing scheme virtually eliminates bearing seizure which can arise from accumulation of particulate contamination between bearing surfaces. The novel advantages in the use of fluid bearings lie in the independent bearing fluid supplies 34 and 36 and the ability to monitor pressure changes in supply lines 38 and 40.

Bearing fluid is supplied to bearing casements 42 and 44 by independent, constant flow supplies 34 and 36, and the fluid pressure monitored by sensor lines 46 and 48, respectively. The fluid from supplies 34 and 36 passes through supply lines 38 and 40, entering assembly mount 10 through external inlets 50 and 52, flowing through channels 54 and 56 into bearing casements 42 and 44 by internal inlets 58 and 60, respectively. During fluid flow in the tubular member, rotor assembly 32 is displaced in the direction of fluid flow giving rise to a pressure change in bearing casements 42 and 44, the pressure change being monitored by sensor lines 46 and 48, respectively. The net pressure differential is measured by transducer 62, which is well known in the art. This pressure difference is proportional to the fluid momentum flux which may then be related to fluid density. A detailed discussion of the procedures necessary to reduce the pressure differential measurements to a density (and also a means to deduce fluid velocity) will appear after the impending discourse on fluid meter assembly 14.

Axially disposed within assembly mount 10 is fluid meter assembly 14 shown in FIG. 4. Fluid meter assembly 14 includes rotor assembly 32 which has six blades 64 equally spaced and attached to rotor hub 66. The blades 64 typically are twisted as one proceeds from rotor hub 66 to the end of blades 64. In one version of blades 64 the degree of twist is such that (tan $\phi$)/R is kept constant. R is the radius from the axis center of rotor assembly 32, and $\phi$ is the angle between the axis of rotor assembly 32 and a vector at radius R parallel to the line of the blade connection at hub 66 and lying in a blade 64. The precise shape and number of blades 64 may be altered to optimize the response of rotor assembly 32 to such fluid flow parameters as the number of phases present in the fluid and the range of fluid velocity and drag forces being measured.

Rotor assembly 32 also comprises shaft 68 press fit into rotor hub 66. Shaft 68 is comprised of three integral portions: right circular, rodded center shaft 70 which concentrically reduces in diameter at both ends to become rodded bearing shafts 72 and 74. Bearing shafts 72 and 74 are right circular rods with gradual, 1 degree taper to shaft ends 76 and 78, respectively. This taper is exaggerated in FIG. 4 for sake of clarity. In the preferred version rotor shaft 68 is a solid piece of material with shaft ends 76 and 78 having a circular cross section. The taper in shafts 72 and 74 equalize fluid pressure about each shaft, thereby improving the reliability of fluid pressure measurements and also preventing contact of shafts 72 or 74 with any internal part of bearing casement 42 or 44, respectively. There are other possible shaft designs which accomplish the equilibration of bearing fluid pressure around the bearing shaft. One such possibility is an untapered bearing shaft with a series of shallow, circumferential grooves in the surface of the shaft, the planes of the grooves perpendicular to the rotor shaft axis, and the grooves spaced equidistant along the shaft axis. A slightly different approach is to divert bearing fluid through the bearing shaft to outlets between the bearing shaft and sleeve: a cylindrical, axial cavity extending from the center, end face of the rotor shaft to the center of the rotor shaft length, a plurality of cylindrical orifices radiating perpendicularly from the terminus of the axial cavity, said plurality of orifices equispaced about the radiating circle, each radiating orifice terminating at the radiating circle, each radiating orifice terminating at the surface of the rotor shaft. The basis of these design options has arisen from another invention undergoing preparation as an application—application Ser. No. 145,940, filed May 2, 1980—entitled "Hydrostatic Bearing for LOFT Drag Disc Turbine Transducer".

In the preferred embodiment, rotor assembly 32 is supported within assembly mount 10 of FIG. 1 by support assemblies 80 and 82 in FIG. 4. Assemblies 80 and 82 comprise support bases 84 and 86, columns 88 and 90, bearing casements 42 and 44, bearing fluid channels 54 and 56, and end caps 92 and 94, respectively. Support bases 84 and 86 are keyed into channel 16 of assembly mount base 12 of FIGS. 1 and 2, and are joined to base 12 by laser welds 18 as shown in FIG. 1. Bearing casements 42 and 44 are joined to casement supports 96 and 98, respectively, by laser welds 18, as shown in FIG. 4. Casement supports 96 and 98 are joined to columns 88 and 90, respectively, by laser welds 18. Columns 88 and 90 are joined to support bases 84 and 86, respectively, by laser welds 18. End caps 92 and 94 are joined to casement supports 96 and 98, respectively by laser welds 18. End caps 92 and 94 act to streamline fluid flow in the vicinity of rotor assembly 32, thereby insuring the flow measurements are properly representative of the intrinsic fluid flow parameters.

Bearing casement 42 comprises sleeve 100, conical recess 104, end base 108, and bearing fluid internal inlet 58, as shown in FIG. 4. Sleeve 100 is of right circular cylindrical geometry, accepting the bearing shaft 72 from the open end of casement 42. Bearing fluid internal inlet 58 is the termination of bearing fluid channel 54 passing through casement 42, column 88, support base 84, and assembly mount base 12. In FIG. 1 is shown external inlet 50 of bearing fluid channel 54 in base 12, inlet 50 being connected by supply line 38 to independent bearing fluid supply 34 which delivers a constant flow. In like fashion the companion bearing casement 44 is provided bearing fluid by independent supply 36, which is connected by supply line 40 to external inlet 52, and passes through channel 56 into bearing 44 at bearing fluid internal inlet 60.

An alternative possible bearing configuration involves the incorporation of the bearing sleeve with the rotor assembly and the attachment of the rodded bearing shaft to the rigid bearing support assembly. Consequently, the bearing sleeve and rotor assembly may turn as one unit freely about a fixed bearing shaft.

If we now consider the actual use of fluid meter assembly 14, it will be apparent that the novel advantages discussed earlier (independent bearing fluid supplies 34 and 36 and the ability to monitor pressure changes in supply lines 38 and 40) make it possible to evaluate the density of a flowing fluid. During the flow of fluid, rotor shaft 68 undergoes displacement in response to fluid drag forces imparted to rotor blades 64. Assuming fluid flow from left to right in FIG. 4, the movement of shafts 72 and 74 in sleeves 100 and 102, respectively, diminishes the flow space in bearing casement 42 and increases the flow space in bearing casement 44. These changes result in a pressure buildup in supply line 38 and a decrease in pressure in supply line 40. Therefore, the force acting in the axial direction upon shaft end 76 will be the measured increase in line pressure multiplied by the area of shaft end 76. An opposing force, smaller in magnitude, will act on the opposite shaft end 78. The net force difference may then be equated to the pressure differential output from the terminus of lines 46 and 48 as detected by transducer 62, multiplied by the area of shaft end 76 or 78. This resultant force, acting in a direction opposite to the fluid flow, will be linearly proportional to the drag forces on rotor assembly 32.

Not only is the measured force proportional to the fluid drag forces, the measured pressure differential in lines 46 and 48 is also linearly proportional to the momentum flux. Consequently, the pressure differential may be converted to momentum flux values by establishing a calibration curve of pressure differential versus known momentum flux values, $\rho V^2$, where $\rho$ = fluid density V = fluid velocity Therefore, in order to determine the density by calculating means 65 $\rho$ we must also independently evaluate the fluid velocity V.

The fluid velocity V is directly proportional to the rotational speed of rotor blades 64. The rotor speed may be measured by an eddy current 63 transducer which is well known in the art. The eddy current transducer 63 may be mounted to the outside of the tubular member in which rotor assembly 32 is operating or attached to shroud 20 of assembly mount 10. An eddy current transducer operates to measure rotor velocity in the following manner: the tips of the electrically conducting blades 64 pass near the eddy current transducer causing induced eddy current pulses in the transducer with a repetition rate characteristic of the rotor speed. These pulses are converted to square wave pulses by a signal conditioner, accumulated in an electronic counter, and converted to revolutions per unit time. Thus, a radial velocity may be determined for the rotor assembly, and with known standard fluid velocities a working, calibration curve may be obtained relating rotor velocity and fluid velocity. Therefore, the fluid density may be deduced by an independent evaluation of momentum flux $\rho V^2$ and fluid velocity V, $$\rho = \rho V^2 / V^2$$

It is important to note that the momentum flux and velocity are determined concurrently from the rotation and displacement of the rotor assembly 32. Therefore, the density and velocity deduced are characteristic of the identical volume sample of the fluid. If separate devices are utilized for velocity and momentum flux, problems may arise from shadowing effects or metering of nonhomogeneous, multiphase fluids.

The embodiments of the invention in which an exclusive property or privilege is claimed are defined as follows:

1. In a device for measuring the density and velocity of a fluid flowing through a tubular member, which comprises a rotor assembly axially disposed within the tubular member, said rotor assembly supported to allow rotation about and translation along the tubular member axis, the rotor assembly consisting of a plurality of blades mounted upon a shaft, a fluid bearing means for suspending the rotor assembly shaft within the tubular member whereby the sliding friction between the rotor shaft and a bearing surface is eliminated, and a means for measurement of rotor blade velocity, the improvement comprising, means for establishing independent constant fluid flow to upstream and downstream fluid bearings whereby a pressure balance is attained between the upstream and downstream sides of the rotor shaft, and detection means for monitoring a fluid pressure differential between the upstream and downstream bearings of the rotor shaft, said pressure differential arising from rotor shaft displacement during fluid flow in either direction in the tubular member.

2. In a drag turbine mass flow meter comprising, a rotor assembly axially disposed within a tubular member, the rotor assembly consisting of a plurality of blades mounted upon a shaft, the rotor shaft extending upstream and downstream from the plurality of blades, means for suspending the rotor assembly within the tubular member whereby the rotor assembly can translate along and rotate about an axis parallel to the tubular member axis, means for measurement of the rotational velocity of the rotor blades, and a hydrostatic bearing assembly for the rotor shaft, said bearing assembly including an upstream and a downstream bearing casement with a fluid inlet port terminating at the internal bearing surface of each casement, the improvement comprising, independent means to provide constant fluid flow to each bearing casement whereby a pressure balance is attained between bearing fluid pressure in each bearing, and means to monitor an imbalance between the upstream and downstream bearing fluid pressure, said pressure imbalance arising from rotor shaft displacement during fluid flow in either direction in the tubular member.

3. The device of claim 2 wherein the means to monitor the pressure imbalance comprises:

a fluid monitor line tapped into each independent means to provide fluid to the bearings, and a differential transducer at the termination of each fluid monitor line to compare the difference between the upstream and downstream hydrostatic bearing fluid pressures.

4. The device of claim 2 wherein the fluid inlet port for each bearing casement is centered on the rotor shaft axis and positioned opposite the end of the rotor shaft.

5. The device in claim 2 wherein the fluid inlet port for each bearing casement is positioned on the internal cylindrical surface of the bearing sleeve, between the end of the rotor shaft and the bearing conical recess located opposite the end of the rotor shaft.

6. The device of claim 2 wherein the rotor shaft is uniformly tapered to a smaller diameter circular cross section proceeding from the connection of the shaft to the hub toward the free end of the shaft, resulting in the fluid pressure in the bearing being equalized by the taper.

* * * * *